United States Patent [19]

Leavell et al.

[11] Patent Number: 5,065,371
[45] Date of Patent: Nov. 12, 1991

[54] DEPTH FINDER HAVING VARIABLE MEASUREMENT CAPABILITIES

[75] Inventors: David R. Leavell, Columbus, Ga.; Earl W. Spencer, Jr., Montgomery; Kenneth W. Goodman, Opelika, both of Ala.

[73] Assignee: Microsonics, Inc., Columbus, Ga.

[21] Appl. No.: 556,830

[22] Filed: Jul. 23, 1990

[51] Int. Cl.⁵ ............................................. G01S 15/96
[52] U.S. Cl. ................................... 367/111; 367/902
[58] Field of Search ................ 367/111, 902; 181/123, 181/124; 73/290 V

[56] References Cited

U.S. PATENT DOCUMENTS 3,942,149  3/1976  Westfall, Jr. .......................... 340/3 R
4,943,951  7/1990  Leavell et al. ........................ 367/111

OTHER PUBLICATIONS

Z-7500 Manual; Eagle Electronics, P.O. Box 669, Catoosa, Okla. 74015; 1987; pp. 1-35.
1988 Eagle Catalog; Eagle Electronics, P.O. Box 669, Catoosa, Okla. 74015; 1988; pp. 1-23.

Primary Examiner—Daniel T. Pihulic
Attorney, Agent, or Firm—Jennings, Carter, Thompson & Veal

[57] ABSTRACT

A depth finder utilizing a CPU to control the function of various components including a transducer, receiver, and a liquid crystal display, allowing a user to select between fresh and salt water operational modes as well as between English and metric display units. The CPU is controlled by a keypad and varies the rate at which stored transducer data is transferred from the receiver to the CPU such that the data is always representative of a fixed depth increment in any operational mode.

5 Claims, 6 Drawing Sheets 5,065,371

1

DEPTH FINDER HAVING VARIABLE MEASUREMENT CAPABILITIES

FIELD OF THE INVENTION

The present invention relates to depth finders such as are utilized by sport fisherman to locate bottom structure and suspended fish in a body of water through the use of sonar pulses directed downwardly into the water. More particularly the present invention relates to such devices which can be used in fresh or salt water and which can display a graphic representation of the sonar reflections.

BACKGROUND OF THE INVENTION

Depth finders or fish finders, as they are sometimes called, have become a common article of equipment for the sport fisherman. These devices have evolved from crude sonar repeaters which gave the user an indication of the bottom depth, to "flasher" units which used a circular dial to "flash" the depth of the bottom or of fish to the current generation of graphic LCD depth finders which utilize a Liquid Crystal Display to present a pictorial display of bottom structure and suspended fish. The current depth finders are sophisticated electronic devices; however, they are somewhat limited when the user changes the environment. Specifically, the current depth finders known to us are calibrated for use in fresh water or are calibrated for use in salt water or depict the depth in feet. However, none of the known devices are usable interchangably in salt or fresh water with a display in either feet or metric units. Accordingly, the sport fisherman who enjoys fresh and salt water fishing and who has the need or desire to correlate charts which may have depths printed in feet or meters thereon has heretofore been unable to obtain a single depth finder capable of functioning in the varied environments.

SUMMARY OF THE INVENTION

It is the object of the present invention to provide a depth finder which can be utilized in both salt and fresh water environments and which can selectively display the sonar reflections in units of feet or meters.

Yet another object of the invention is to provide a user friendly depth finder which facilitates the selection of the depth measurement and the display scale.

The present invention accomplishes each of these results by combining the intelligent technology presented by U.S. patent Ser. No. 380,796 now U.S. Pat. No. 4,943,951, owned by the assignee of the instant patent with a unique configuration to yield a depth finder with a self contained tutorial mode and the capability of selectively presenting a fresh water/display in feet mode, a fresh water/display in meters mode, a salt water/display in feet mode, or a salt water/display in meters mode. It should be understood that the present apparatus utilizes a central processor unit including a microprocessor and an erasable programmable read only memory to control the operational characteristics of the depth finder. To vary the operation of the depth finder the user must interface with the microprocessor. In the present invention, a single key button is used to send a signal to the central processor unit (CPU) which is programed to recognize the signal from that button and to alter the sequence of program steps responsive to that signal to thereby alter control signals sent to the controllable circuitry of the depth finder to alter the operation of that circuitry such that the circuitry compensates for the difference in the speed of sound in salt and fresh water, and to compensate in the display for the variation in a metric versus feet display.

BRIEF DESCRIPTION OF THE DRAWINGS

Apparatus embodying features of my invention and the utilization thereof are depicted in the accompanying drawings which form a portion of this disclosure, and wherein.

DESCRIPTION OF A PREFERRED EMBODIMENT

Figure 1:
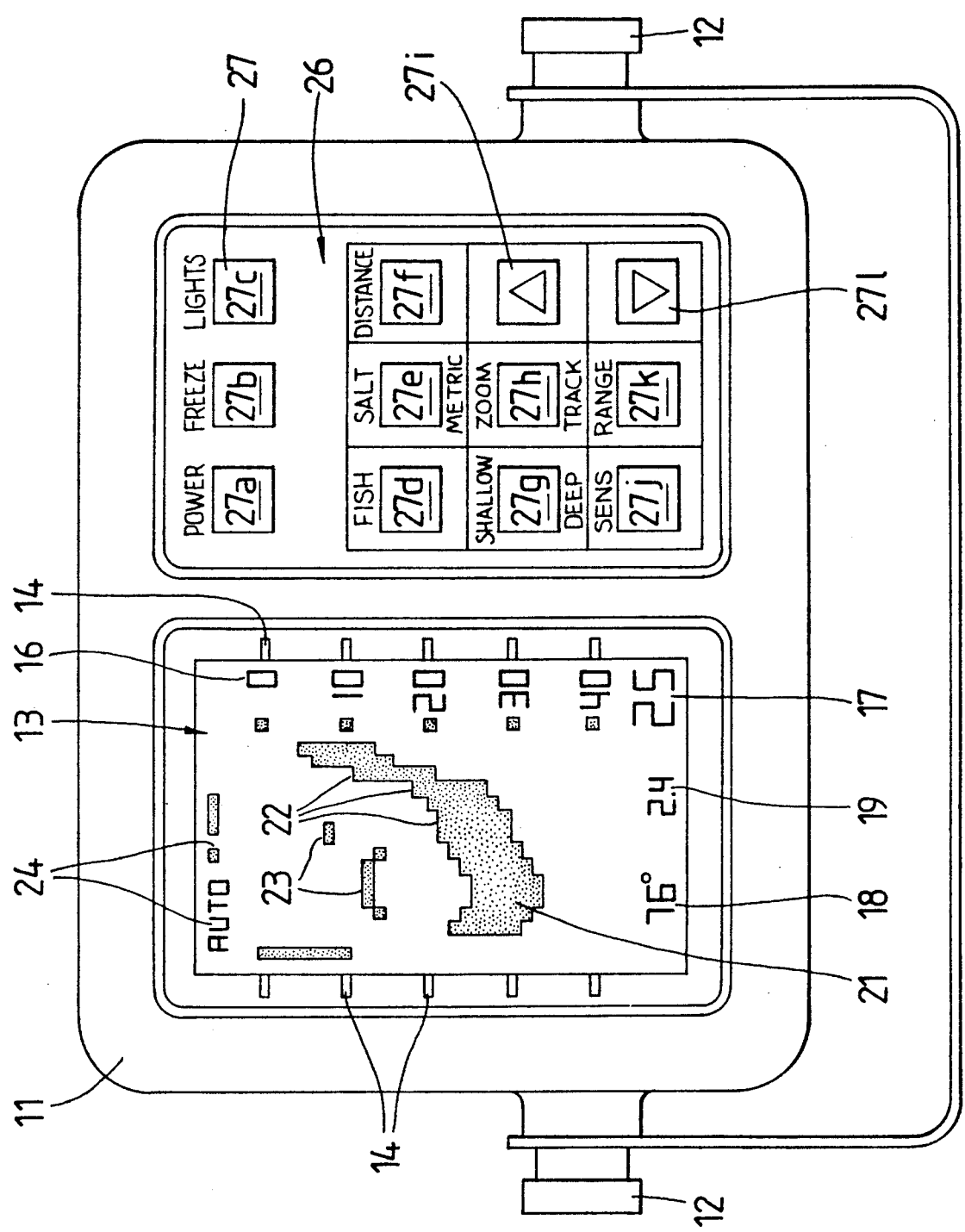
FIG. 1 is a pictorial display of the face of my depth finder control panel.
Figure 2:
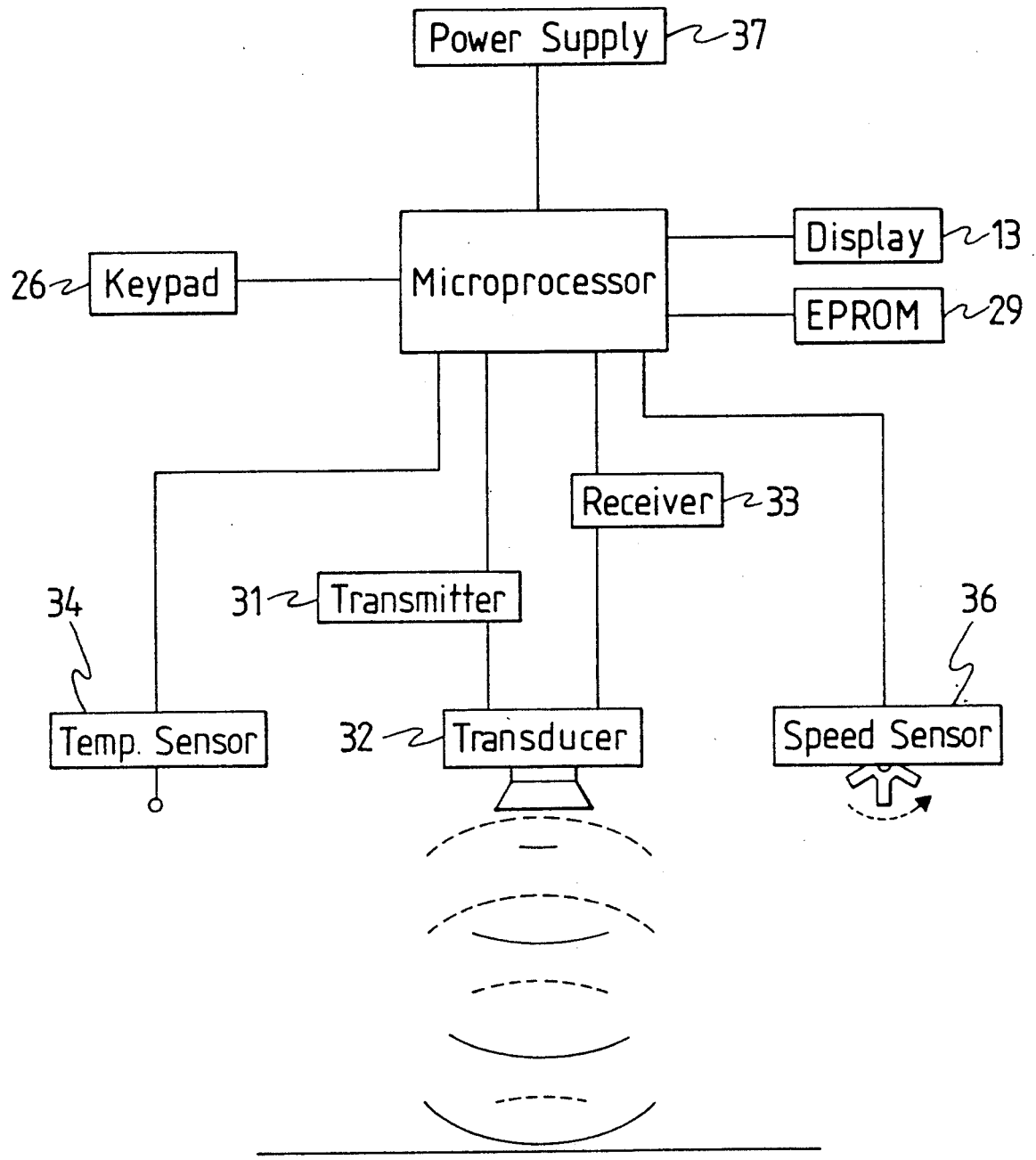
FIG. 2 is a schematic block diagram of the invention.

Referring to the drawings for a clearer understanding of the invention, FIG. 1 depicts the external appearance of the depth finder including a housing 11 which encases the majority of the electronic components and which can be physically adjusted by a pair of knobs 12 to enhance the users ability to view a screen 13 whereon graphic information derived from underwater sounding is displayed. Presented on the screen are such indicia as depth markers 14 in the form of spaced apart horizontal bars. A numeric indicator 16 of the depth associated with each depth marker 14. A numeric indicator 17 which indicates the bottom depth. A temperature display 18 and a speed display 19. A broadened band of coloration 21 indicates the bottom with the top 22 of the band indicating the contours of the bottom surface. A set of indicia 23 indicate the presence of fish. A set of annunciators displays 24 indicate various pictorial modes of the depth finder. A keypad 27 having a plurality of keypad buttons 27a to 27l is an input device which allows the user to select the operational mode of the device from those available. In current depth finders, the most important differences between competing models are not readily discernible hardware differences but rather the manner in which the operator is able to interact with the depth finder to perform different functions which will enable the operator to locate underwater objects more efficiently. Accordingly, the block diagram in FIG. 2 represents the present invention and other devices. It is the specific interaction and action of the components which distinguishes the devices in the marketplace such that one device may be preferred over another. With reference to FIG. 2, it may be seen that keypad 26 is directly connected to a microprocessor 28 which is a part of what will be referred to as a central processing unit or CPU. The other part of the CPU, in this simplified diagram is an erasable programmable read only memory (EPROM) 29. The CPU contains a resident program which controls the operation of the remainder of the device and receives and processes signals from the remainder of the device to provide the user with information on the display or screen 13. Necessary to the operation of the depth finder is the transmitter 31, transducer 32, and the receiver 33 circuitry, as shown in FIG. 2. Also included in the apparatus are a temperature sensor 34 and a speed sensor 36. The power supply 37 is typically a 12 or 24 volt battery.

Figure 3:
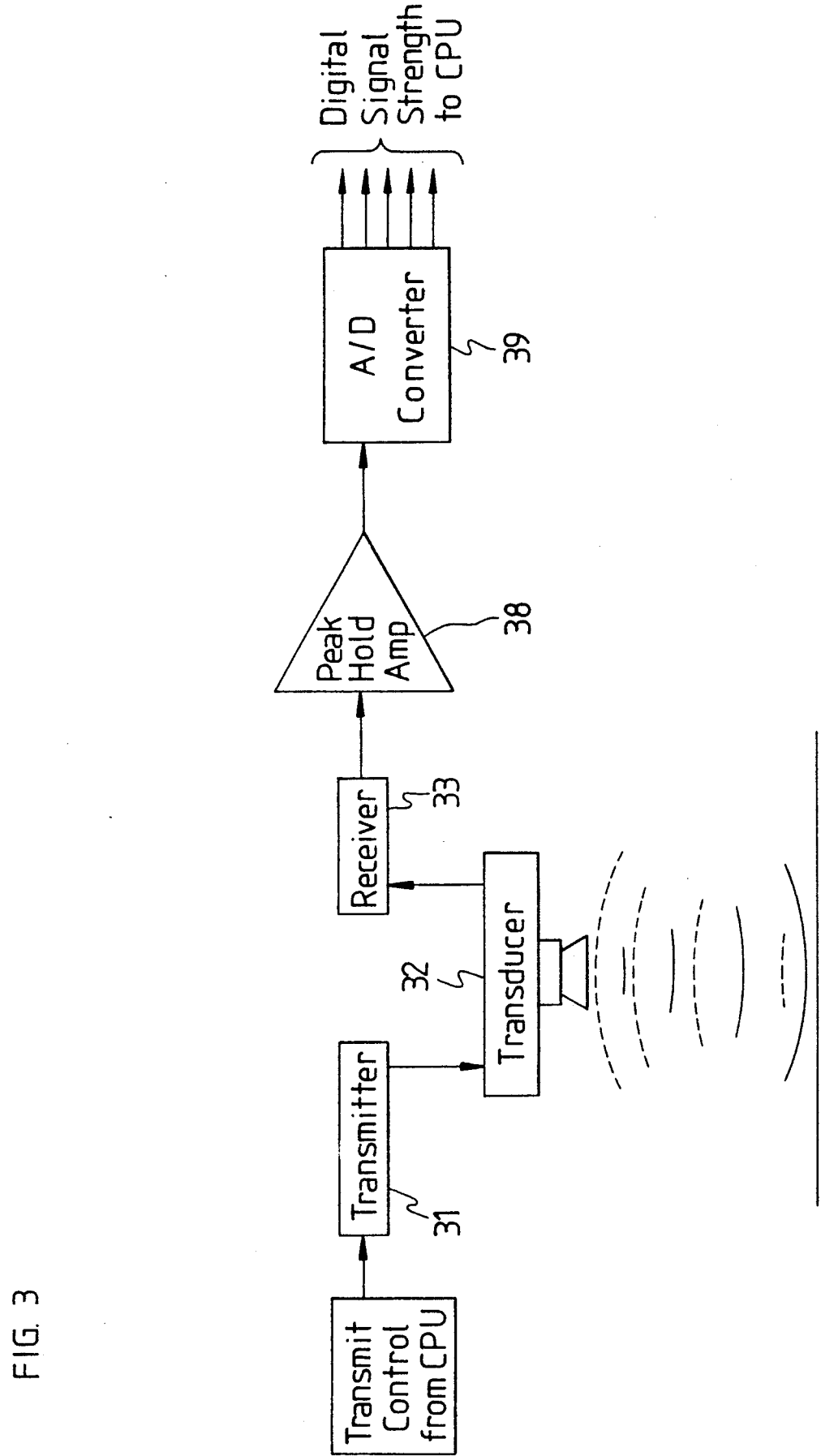
FIG. 3 is a schematic block diagram of the sounding and sampling portion of the invention.

As may be seen more clearly in FIG. 3, the transmitter 31 and receiver 33 circuit receive control input from the CPU to regulate the transmission of the sounding pulses as well the receiving and sampling of reflected sounding pulses. Such control allows the apparatus to vary the gain, the sensitivity, and other operating parameters of the depth finder; however, the precise manner of such regulation is not within the contemplation of the present invention; thus, further description thereof will be omitted in the interest of clarity and only those components and the relationships which are germane to the present invention will be discussed. Note that in FIG. 3, the component marked receiver represents a plurality of amplifiers and filters which provide an amplified and shaped signal to a peak hold amplifier (PHA) 38 which will retain or hold the peak signal received until reset by the CPU. When the CPU tells the PHA 38 to send the signal on, the signal is passed to an analog to digital converter 39 for input to the CPU. Note that the rate at which the CPU signals the PHA 38 determines the sample rate of the receiver. Inasmuch as the sounding pulse travels though salt or fresh water at a given speed, $S_S$ or $S_F$, respectively then the depth increment for each sample period is determined by $(S/f)/2$ when S is the speed and f is the frequency of the sampling and two indicates that the pulse must be reflected to be received during a specific sampling period.

Figure 4:
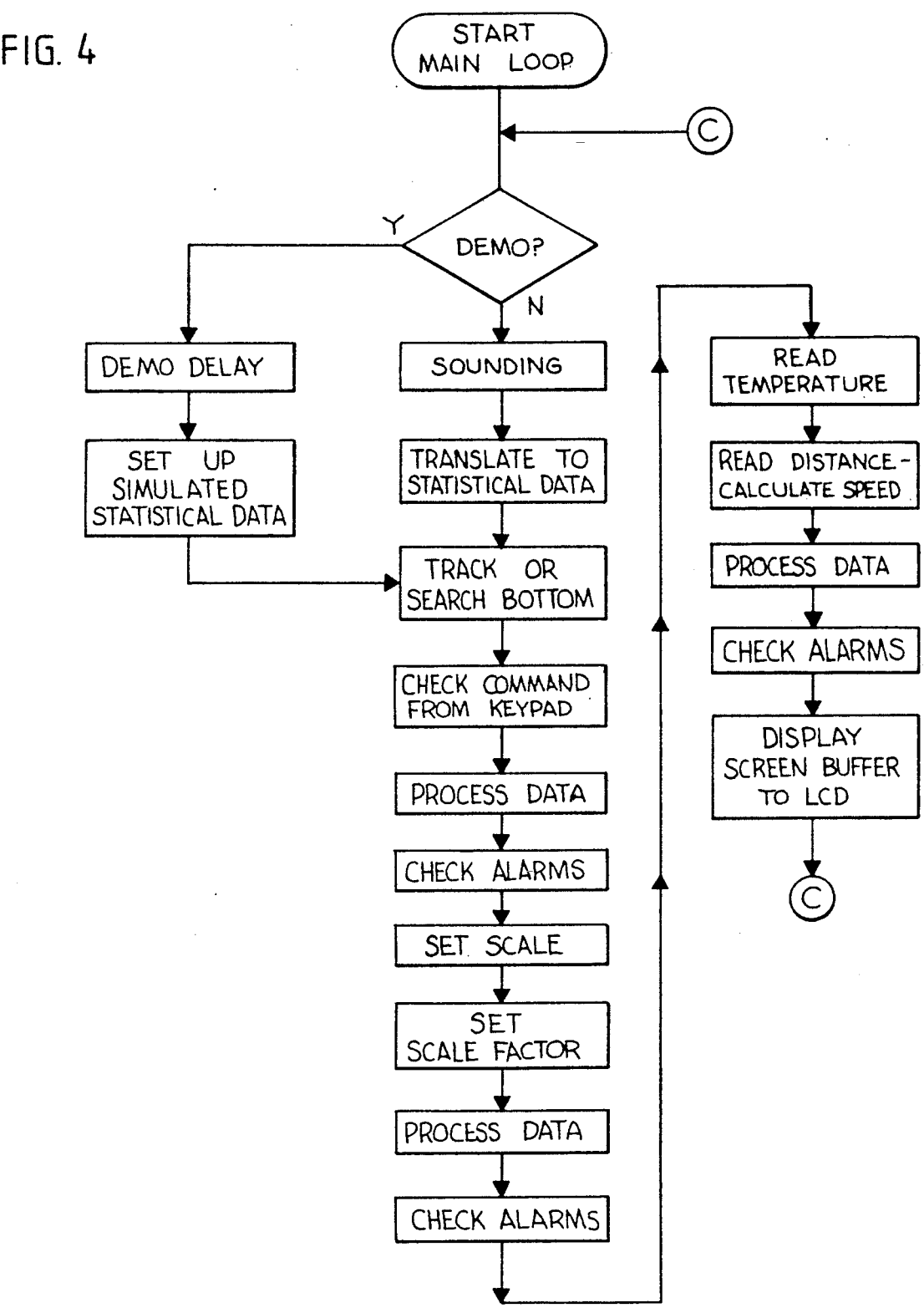
FIG. 4 is a flow chart depicting the operation of the depth finder.

FIG. 4 is a flow chart representative of the operation of the CPU during each interactive loop of operation of the apparatus. Note that the individual steps may be chosen to suit the design needs in so far as the basic operation of the device is concerned; however, this invention is concerned with only those steps which are not common to the operation of all LCD type depth finders, thus, only those steps which are material to the invention will be discussed. As may be seen in FIG. 4, the flow chart indicates a decision step immediately upon entering the loop at "Demo(?)" This relates to the tutorial and demonstration aspects of the device which are explained in U.S. patent Ser. No. 07/380,796 now U.S. Pat. No. 4,943,951, owned by the common assignee which is incorporated herein by reference. It should be noted that the "Demo(?)" decision is controlled by the users input via the keypad 26 as explained in the referenced document.

Figure 5:
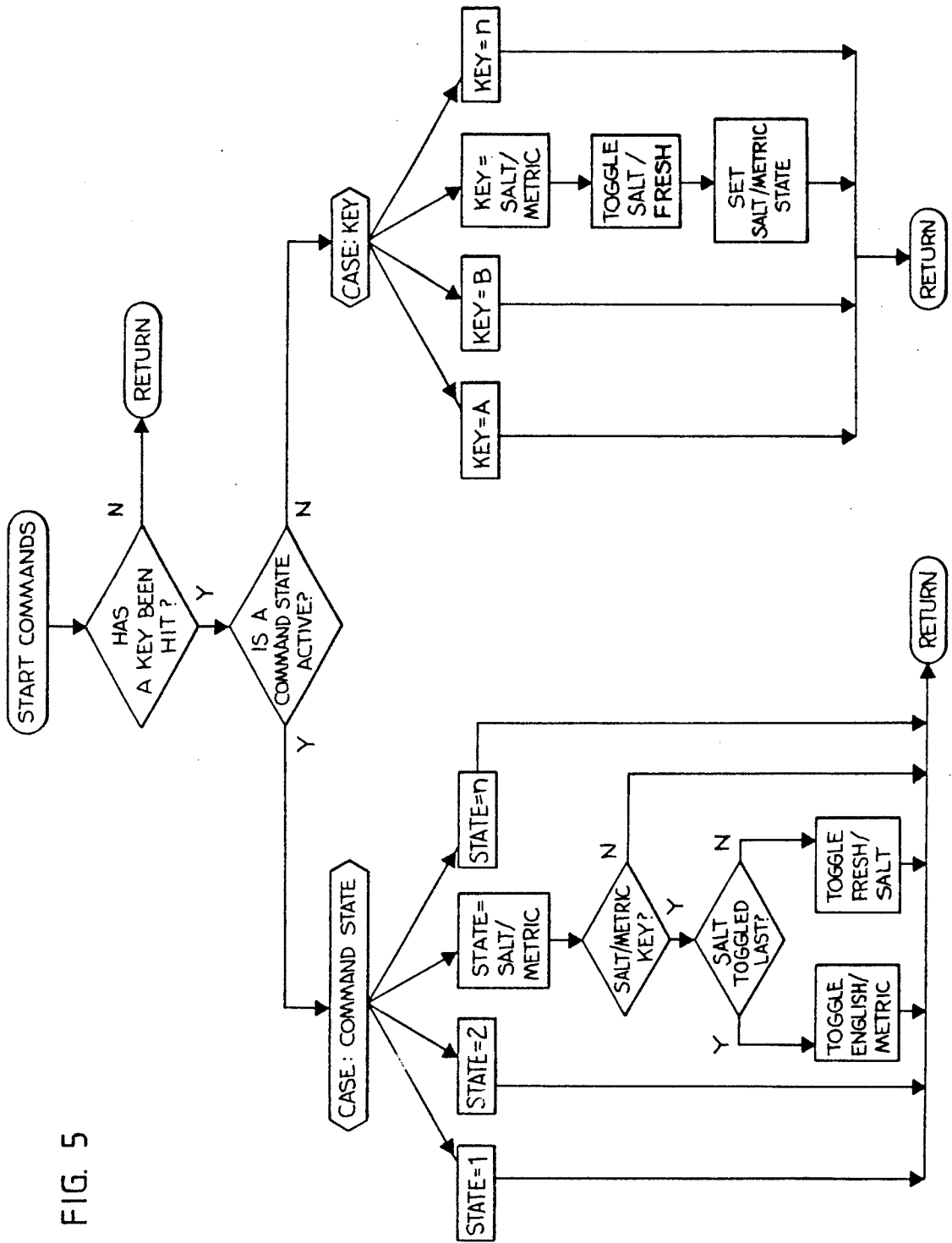
FIG. 5 is a flow chart depicting the interaction of the keypad and the depth finder sampling electronics.

Assuming that the demo mode is not selected, the apparatus begins sounding, wherein acoustic waves output by the transducer are reflected from underwater objects, detected by the transducer and amplified by the receiver for input into the CPU which translates the input signal into statistical data. As may be seen in FIG. 5, the sounding operation allows our apparatus to discriminate between salt and fresh water by varying the sampling rate. This is accomplished by varying a timer in the CPU which initiates the data transfer from the peak hold amp 37 to the CPU. The timer allows the CPU to sample at a rate such that $S_S/f_S = S_F = \frac{1}{4}$ feet in the instant device, however, a different depth increment may be selected as long as $S_S/f_S = S_F/f_F$ Thus, during each cycle of operation as indicated by the flow chart, the sounding operation would set the timer for the appropriate environment.

Figure 6:
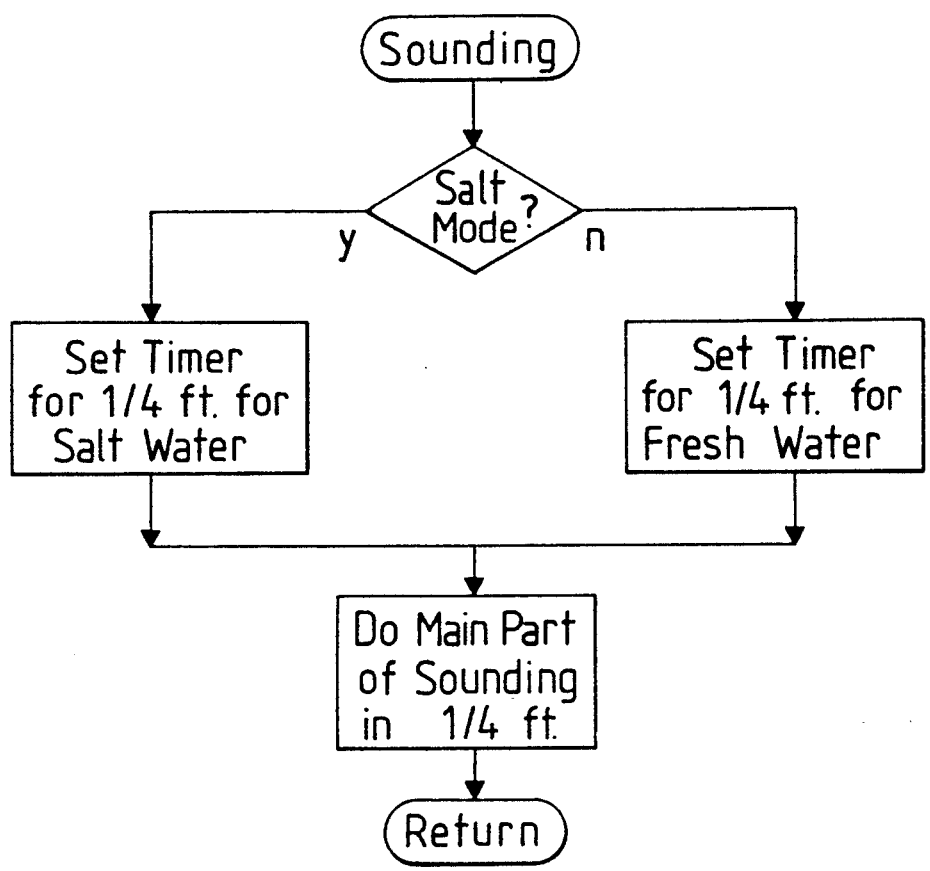
FIG. 6 is a flow chart depicting the interaction of the keypad and the modes of operation of the depth finder for various environments.

Selection of the appropriate environment is a choice left up to the operator who makes the information available to the depth finder by pressing key 27e of FIG. 1, which is one of the command state keys which allow the operator to vary a mode of operation. As shown in FIG. 4 & 6, the CPU is required to check commands from the keypad 26 during each cycle. If no command key has been entered, then the CPU returns to the main loop. If the salt metric key 27e has been entered, then the CPU checks to see if the command state corresponding to key 27e or any other command state is active. The CPU can be prepared to hold a state as active for a predetermined time for purposes illustrated hereinafter. If no state is active, the CPU determines which key is entered and sets the command state is corresponding thereto as an active state. If key 27e is entered, the mode of the depth finder is changed and the command state is set to active. If the command state corresponds to key 27e is already set to active, then the CPU determines whether key 27e has been entered. If not, then the salt/metric mode is not affected. If the salt metric key has been entered, then the mode is toggled. As may be seen in FIG. 5, the two related binary mode selection give four distant operating modes, which are selected sequentially, e.g. fresh and English, then salt and English, then salt and metric, then fresh and metric. Each time the key 27e is depressed the mode changes to the next mode.

Figure 7:
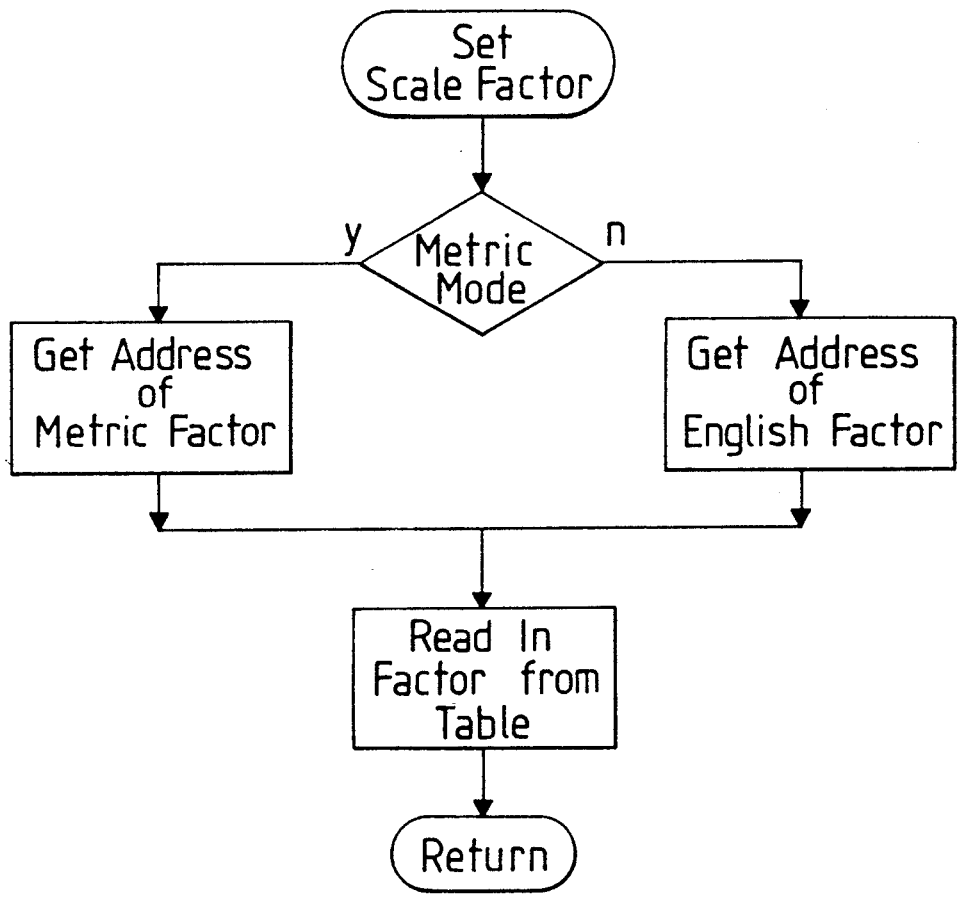
FIG. 7 is a flow chart showing the scale selection operation.

Note that when the English/metric selection is made using key 27e, the set scale factor loop in FIG. 7 causes the scale factor for relating measurements in pixels on the display 13 to physical depth increments to change. The scale factor depends on the measurement mode and the depth range currently in effect. The selection of the correct scale factor is conveniently accomplished using a table in the CPU containing the precalculated scale factor for each possible depth range. The table contains data for the complete set of English and metric depth ranges. The selected scale factor is applied by the CPU to format the graphical data on the display screen 13. Annunciation on the display 13 indicate the currently effective settings for example "salt" and "metric" where appropriate.

The remainder of the main loop relates to conventional data manipulation and transfer to buffers for presentation on the display 13. Such manipulation is well known is not germane to the inventive feature for which protection is sought and are largely a matter of choice to those skilled in the art; thus, no discussion of further operation of a depth finder is intended.

While I shown my invention in one form, it will be obvious to those skilled in the art that it is not so limited, but is susceptible of various other changes and modifications without departing from the spirit thereof.

What I claim is:

1. A depth finder utilizing sonar pulses to locate the bottom of a body of water and objects submerged within the body of water comprising a transmitter for producing sonar pulses, a transducer connected to said transmitter for inputting and directing sonar pulses in said body of water, a receiver for amplifying detected sonar pulses, a microprocessor including a programmable controller having resident therein a set of instructions for controlling the receipt of signals from said receiver and for calculating the depth of a sonar reflection from transmitted and detected sonar pulses, with said microprocessor being operably connected to said transmitter and receiver and a display means, the improvement in said depth finder comprising: operator input means connected to said microprocessor for providing commands thereto; means responsive to said input means for selectively varying the rate at which detected sonar pulses are sampled interactive with said set of instructions to selectively sample at a first rate or a second rate wherein said first rate is correlated to the speed of sound in fresh water such that $S_F/F_F = S_S/F_S$ Where $S_F$ = speed of sound in fresh water
$F_F$ = sampling rate in fresh water
$S_S$ = speed of sound in salt water
$F_S$32 sampling rate in salt water; and means responsive to said input means for selectively varying the scale of a display presented on said display means.

2. A depth finger utilizing sonar pulses to locate the bottom of a body of water and objects submerged within the body of water comprising a transmitter for producing sonar pulses, a transducer connected to said transmitter for inputting and directing sonar pulses in said body of water, a receiver for amplifying detected sonar pulses, a microprocessor operably connected to said transmitter and receiver and a display means, sample and hold means connected to said microprocessor for interactively storing data representative of detected sonar pulses the improvement in said depth finder comprising: operator input means connected to said microprocessor for providing commands thereof; means responsive to said input means for selectively varying the rate at which detected sonar pulses are sampled wherein said means for varying the rate of sampling interacts with a program resident in said microprocessor to selectively sample and hold data in said sample and hold means at a first rate and at a second rate and wherein said first rate is correlated to the speed of sound in salt water and said second rate is correlated to the speed of sound in fresh water such that $S_f/F_F = S_S/F_S$ Where $S_F$ = speed of sound in fresh water
$F_F$ = sampling rate in fresh water
$S_S$ = speed of sound in salt water
$F_S$32 sampling rate in salt water; and means responsive to said input means for selectively varying the scale of a display presented on said display means.

3. A depth finder as defined in claim 2 wherein said microprocessor includes a programmable memory having a table therein of scale factors for use in scaling an image presented on said display means.

4. A depth finder utilizing sonar pulses to locate the bottom of a body of water and objects submerged within the body of water comprising a transmitter for producing sonar pulses, a transducer connected to said transmitter for inputting and directing sonar pulses in said body of water, a receiver for amplifying detected sonar pulses, a microprocessor operably connected to said transmitter and receiver and a display means, the improvement in said depth finder comprising; operator input means connected to said microprocessor for providing commands thereto; means responsive to said input means for selectively varying the rate at which detected sonar pulses are sampled; and means responsive to said input means for selectively varying the scale of a display presented on said display means wherein said input means comprises a digital toggle operatively connected to said microprocessor to present a digital signal to said microprocessor, said signal being detected in said microprocessor in a memory resident program, said program being selectively modified responsive to detection of said signal by said means for varying the sampling rate or said means for varying the scale, such that said program changes the microprocessor output to and said receiver means to change the calibration of said depth finder selectively to salt or fresh water.

5. A depth finder as defined in claim 4, wherein said microprocessor includes a programmable memory having a table therein of scale factors for use in scaling an image presented on said display means.

* * * * *